(12) United States Patent
Kuzumaki et al.

(10) Patent No.: US 8,649,198 B2
(45) Date of Patent: Feb. 11, 2014

(54) POWER CONVERSION DEVICE

(75) Inventors: Atsuhiko Kuzumaki, Tokyo (JP); Hiroshi Mochikawa, Tokyo (JP); Takeru Murao, Saitama (JP); Masahiro Takasaki, Tokyo (JP); Tadao Ishikawa, Tokyo (JP); Toshiaki Kikuma, Tokyo (JP)

(73) Assignees: Kabushiki Kaisha Toshiba, Tokyo (JP); Central Research Institute of Electric Power Industry, Tokyo (JP)

( * ) Notice: Subject to any disclaimer, the term of this patent is extended or adjusted under 35 U.S.C. 154(b) by 196 days.

(21) Appl. No.: 13/330,735

(22) Filed: Dec. 20, 2011

(65) Prior Publication Data

US 2012/0087167 A1 Apr. 12, 2012

Related U.S. Application Data

(63) Continuation-in-part of application No. PCT/JP2010/004227, filed on Jun. 25, 2010.

(30) Foreign Application Priority Data

Jun. 26, 2009 (JP) .................................. 2009-152504

(51) Int. Cl.
*H02M 7/5387* (2007.01)
*H02M 3/335* (2006.01)
*H02M 3/24* (2006.01)
*H02M 7/44* (2006.01)

(52) U.S. Cl.
USPC .............................. 363/132; 363/17; 363/98

(58) Field of Classification Search
USPC ................. 363/95–98, 55, 56.01, 56.02, 109, 363/131–137, 15–17
See application file for complete search history.

(56) References Cited

U.S. PATENT DOCUMENTS

| 7,872,888 B2 | 1/2011 | Kuzumaki et al. |
| 8,089,780 B2 | 1/2012 | Mochikawa et al. |

(Continued)

FOREIGN PATENT DOCUMENTS

| CN | 101399503 A | 4/2009 |
| CN | 101401289 A | 4/2009 |

(Continued)

OTHER PUBLICATIONS

International Search Report issued Aug. 17, 2010, in PCT/JP2010/004227, filed on Jun. 25, 2010 (with English Translation).

(Continued)

*Primary Examiner* — Timothy J Dole
*Assistant Examiner* — Carlos Rivera-Perez
(74) *Attorney, Agent, or Firm* — Oblon, Spivak, McClelland, Maier & Neustadt, L.L.P.

(57) ABSTRACT

Disclosed is a power conversion device which achieves reductions in switching loss due to a reverse recovery current and heat generation loss. Specifically disclosed is a power conversion device provided with a cascode element configured by electrically connecting a normally-on switching element and a normally-off switching element in series and connecting a gate terminal of the normally-on switching element and a source terminal of the normally-off switching element via a cascode connection diode, and a high-speed diode electrically connected in parallel with the cascode element and having a cathode region connected to a positive electrode terminal and an anode region connected to a negative electrode terminal.

20 Claims, 4 Drawing Sheets

(56) References Cited

U.S. PATENT DOCUMENTS

| | | | |
|---|---|---|---|
| 8,228,113 B2* | 7/2012 | Domes | 327/427 |
| 2006/0245216 A1* | 11/2006 | Wu et al. | 363/13 |
| 2009/0167411 A1* | 7/2009 | Machida et al. | 327/427 |
| 2012/0086374 A1* | 4/2012 | Arisawa et al. | 318/400.32 |

FOREIGN PATENT DOCUMENTS

| | | |
|---|---|---|
| JP | 62-100164 A | 5/1987 |
| JP | 2001-251846 A | 9/2001 |
| JP | 2006-158185 A | 6/2006 |
| JP | 2007-82351 A | 3/2007 |
| JP | 2007-252055 A | 9/2007 |
| JP | 2008-193839 A | 8/2008 |

OTHER PUBLICATIONS

English translation of the International Preliminary Report on Patentability issued Jan. 26, 2012, in PCT/JP2010/004227.

English translation of the Written Opinion of the International Searching Authority issued Aug. 17, 2010, in PCT/JP2010/004227.

Office Action dated Sep. 24, 2013, issued in Chinese Patent Application No. 201080024085.7.

* cited by examiner

POWER CONVERSION DEVICE

CROSS REFERENCES TO RELATED APPLICATIONS

This application is a continuation-in-part (CIP) application based upon the International Application PCT/JP2010/004227, the International Filing Date of which is Jun. 25, 2010, the entire content of which is incorporated herein by reference, and claims the benefit of priority from the prior Japanese Patent Application No. 2009-152504, filed in the Japanese Patent Office on Jun. 26, 2009, the entire content of which is incorporated herein by reference.

FIELD

The present invention relates to a power conversion device in which arms each having series connected normally-on switching element and a normally-off switching element are bridge-connected to each other.

BACKGROUND

A junction field effect transistor (JFET) or a static induction transistor (SIT) constituting a power conversion device is a power semiconductor switching element capable of achieving high-speed operation in high-voltage/high power region.

The power semiconductor switching element may be typified by a normally-on characteristic in which drain current flows therein when the gate voltage is 0 [V]. When drain voltage is applied in a state where negative polarity voltage is not sufficiently applied to a gate electrode, large drain current may flow to break the power semiconductor switching element. Therefore, the power semiconductor switching element is comparatively more difficult to handle than a transistor having a normally-off characteristic, such as a bipolar transistor, a metal-oxide semiconductor field-effect transistor (MOSFET), or an insulated gate bipolar transistor (IGBT).

To solve such a technical problem, a power conversion device is disclosed in Jpn. Pat. Appln. Laid-Open Publication No. 2001-251846, the entire content of which is incorporated herein by reference. The power conversion device constituted by a normally-off composite semiconductor element (hereinafter, referred to merely as "cascode element") in which a static induction transistor (SIT) and an insulated gate field-effect transistor (IGFET) are cascode-connected to each other is proposed.

FIG. 4 is a main circuit diagram of a bridge-connected power conversion device in which some power semiconductors are replaced by other ones.

That is, in the power conversion device of FIG. 4, a normally-on semiconductor element is changed from a static induction transistor (SIT) to a junction field effect transistor (JFET) 111, and an inverter main circuit 3 of the power conversion device includes six three-phase arms connected in a bridge configuration, wherein an arm of each phase is constituted by a cascode element 110 including the junction field effect transistor 111 and a metal-oxide semiconductor field-effect transistor (MOSFET) 112 of a normally-off semiconductor element which are electrically connected in series to each other.

In FIG. 4, reference numeral "1" denotes a DC power supply, "2" denotes a smoothing capacitor, "113" denotes a diode (rectifier diode) parasitic (incorporated) between the source and the drain regions at the manufacturing time of the metal-oxide semiconductor field-effect transistor 112.

In the conventional inverter main circuit 3 having the above configuration, the cascode element 110 is put into an OFF state in a gate power at the loss of gate power supply occurring, e.g., at power-on time or at abnormal time, so that it is possible to prevent a short circuit fault of the inverter main circuit 3. Further, a gate driving circuit (not illustrated) is connected to the gate terminal of the metal-oxide semiconductor field-effect transistor 112 to thereby switch ON/OFF of the cascode element 110.

As described above, the diode (rectifier diode) 113 is incorporated between the source and the drain regions of the metal-oxide semiconductor field-effect transistor 112. Thus, with attention focused on the U-phase, current (hereinafter, referred to merely as "return current") can be made to flow from an output terminal U (common connection terminal shared with a negative arm that is the X-phase arm) to a positive-side DC bus $1p$ through a diode $113u$ and a junction field effect transistor $111u$.

The following points have not been addressed in the power conversion device of FIG. 4.

That is, when the cascode element $110u$ of one arm (e.g., U-phase arm) is turned conductive (ON) at the time of switching operation, a diode $113x$ of a metal-oxide semiconductor field-effect transistor $112x$ of the counterpart arm (X-phase arm) is turned non-conductive (OFF).

At this time, minority carriers are accumulated in a depletion layer generated in a PN junction part of the diode 113 in a non-conductive state. The minority carriers accumulated in the depletion layer flow to the diode $113x$ as reverse recovery current, causing reverse recovery loss. The reverse recovery loss is switching loss of the diode $113x$ and is caused every switching operation. Further, the reverse recovery current flows into the cascode element $110u$ in the conductive transient state, as a result, the switching loss of the cascode element $110u$ increases.

The increase in the switching loss results in an increase in heat generation loss. This requires the use of a large size cooling heat sink, leading to an increase in the size of the power conversion device.

Such a problem is not specific to the junction field effect transistor 111 constituting the cascode element 110 in the power conversion device but occurs also in the case where the junction field effect transistor 111 is replaced by the static induction transistor (SIT).

The present invention has been made to solve the above problem, and an object thereof is to provide a power conversion device capable of reducing the switching loss and the heat generation loss caused by the reverse recovery current.

BRIEF DESCRIPTION OF THE DRAWINGS

The above and other features and advantages of the present invention will become apparent from the discussion herein below of specific, illustrative embodiments thereof presented in conjunction with the accompanying drawings, in which.

DETAILED DESCRIPTION

Figure 1:
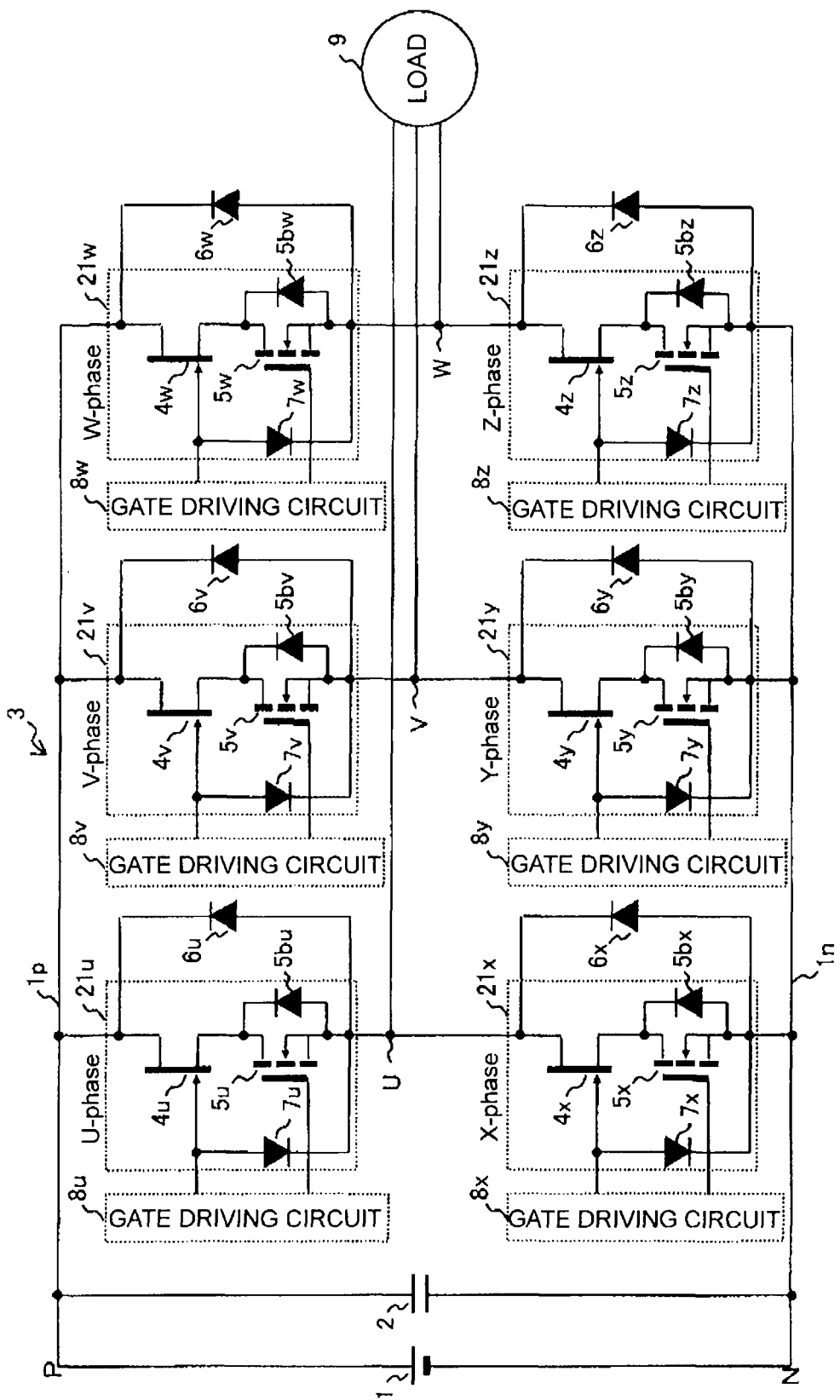
FIG. 1 is a main circuit diagram illustrating a configuration of a power conversion device according to a first embodiment of the present invention.

Embodiments of a power conversion device according to the present invention will be described below with reference to the accompanying drawings. Throughout the drawings, the same reference numerals are given to components having the same functions for avoiding an overlapping description.

First Embodiment

FIG. 1 is a main circuit diagram illustrating a power conversion device according to a first embodiment.

Configuration

In FIG. 1, a DC power supply 1 is obtained by rectifying three-phase AC power supply. A smoothing capacitor 2 and an inverter main circuit 3 are connected between a positive-side DC bus 1p and a negative-side DC bus 1n of the DC power supply 1.

In order to convert the DC voltage of the DC power supply 1 into three-phase AC, U-phase, V-phase, and W-phase cascode elements 21u, 21v, and 21w each constituting a positive arm and X-phase, Y-phase, and Z-phase cascode elements 21x, 21y, and 21z each constituting a negative arm are three-phase bridge connected to constitute the inverter main circuit 3. Although the inverter main circuit 3 of FIG. 1 is a two-level/three-phase output inverter, the number of levels thereof may be three or more, and the output phase thereof may be single-phase or multi-phase.

Output terminals U, V, and W which are common connection points shared by the respective phases (U-phase, V-phase, and W-phase) constituting the positive arm of the inverter main circuit 3 and respective phases (X-phase, Y-phase, and Z-phase) constituting the negative arm are connected to an AC load 9 such as an AC electric motor. Although the output terminals U, V, and W which are common connection points between the respective phases of the positive arm of the inverter main circuit 3 and respective phases of the negative arm are connected to the AC load 9 such as an AC electric motor in FIG. 1, they may be connected not to the AC load 9 but connected so as to be used in utility grid interconnection.

The cascode elements 21u, 21v, . . . , 21z constituting the arms of respective phases are constructed as follows. That is, the normally-on switching elements 4u, 4v, 4w, 4x, 4y, and 4z and the normally-off switching elements 5u, 5v, 5w, 5x, 5y, and 5z are electrically connected in series, and the cascode-connecting diodes 7u, 7v, 7w, 7x, 7y, and 7z are connected (cascode-connected) in a forward direction between the gates of the normally-on switching elements 4u, 4v, 4w, 4x, 4y, and 4z and the sources of the normally-off switching elements 5u, 5v, 5w, 5x, 5y, and 5z. Note that diodes 5bu, 5bv, 5bw, 5bx, 5by, and 5bz are incorporated between the source regions and the drain regions of the normally-off switching elements 5u, 5v, 5w, 5x, 5y, and 5z.

High-speed diodes 6u, 6v, 6w, 6x, 6y, and 6z are connected in reverse parallel between the drains of the normally-on switching elements 4u, 4v, 4w, 4x, 4y, and 4z and the sources of the normally-off switching elements 5u, 5v, 5w, 5x, 5y, and 5z.

The gates of the normally-on switching elements 4u, 4v, . . . , 4z and gates of the normally-off switching elements 5u, 5v, . . . , 5z are connected to gate driving circuits 8u, 8v, 8w, 8x, 8y, and 8z, respectively.

In the first embodiment, the normally-on switching elements 4u, 4v, . . . , 4z of the cascode elements 21u, 21v, . . . , 21z are each constituted by a junction field effect transistor. As the junction field effect transistor, one that is turned non-conductive (OFF) when the gate potential applied to a gate electrode is lower than the source potential applied to the source region by, e.g., 25 [V] or more and turns conductive (ON) when the gate potential is higher than the source potential by 25 [V] or more may be used. The normally-on switching element 4u, 4v, . . . , 4z may be constituted by a static induction transistor in place of the junction field effect transistor.

Both the junction field effect transistor and the static induction transistor can each achieve high-speed operation in high-voltage/high power region and reduce switching loss in forward and backward directions.

The normally-off switching elements 5u, 5v, . . . , and 5z are each of a transistor having a metal-insulator-semiconductor structure. That is, in the first embodiment, a MOSFET (Metal Oxide Semiconductor Field Effect Transistor), a MISFET (Metal Insulator Semiconductor Field Effect Transistor), and an IGFET (Insulated Gate Field Effect Transistor) may be used as the normally-off switching element 5.

The high-speed diodes 6u, 6v, . . . , and 6z are, in e.g., the U-phase, connected in reverse parallel to the cascode element 21u for the purpose of mainly actively making current flow not in the cascode element 21u but in the high-speed diode 6u when the current flows from an output terminal U of the inverter main circuit 3 to the positive-side DC bus 1p so as to reduce loss. The same applies to the arms of other phases. As the high-speed diode 6, a Fast Recovery Diode (FRD) can practically be used. This is because the FRD is shorter in reverse recovery time and smaller in reverse recovery loss than the built-in diodes 5bu, 5bv, . . . , and 5bz of the normally-off switching element 5.

In the power conversion device of the first embodiment, the normally-on switching element 4, the normally-off switching element 5, and the high-speed diode 6 of the cascode element 21 are each constituted by a single semiconductor chip, and a single or a plurality of packages are formed from these semiconductor chips to thereby construct the power conversion device.

Further, in the power conversion device, two or more of the normally-on switching element 4, the normally-off switching element 5, and the high-speed diode 6 of the cascode element 21 may be packaged into one package for modularization purposes.

Furthermore, in the power conversion device, a plurality of semiconductor chips each having one or more of the above elements may be formed into one package as a module.

Operation

For example, in FIG. 1, the gate driving circuit 8u of the U-phase cascode element 21u maintains the normally-off switching element 5u in an ON state by constantly applying positive voltage of a sufficient magnitude to turn ON the normally-off switching element 5u between the gate and the source of the element 5u.

When negative voltage of a magnitude having a sufficient magnitude to turn OFF the normally-on switching element 4u is applied between the gate and the source of the element 4u, the normally-on switching element 4u is turned OFF, and the cascode element 21u assumes an OFF state. When zero or positive voltage is applied between the source and the gate of the normally-on switching element 4u, the normally-on switching element 4u is tuned ON, and the cascode element

21*u* assumes an ON state. The turn ON operation and the turn OFF operation of the cascode elements other than the 21*u*, i.e., cascode elements 21*v*, 21*w*, 21*x*, 21*y*, and 21*z* are the same as those of the 21*u*, so that the descriptions thereof will be omitted.

Next, a case where the return current flows from the output terminal U to the positive-side DC base 1*p* through the U-phase arm when the U-phase cascode element 21*u* is in an ON state and the cascode element 21*x* is in an OFF state will be described.

In this case, the return current flows into the positive-side DC bus 1*p* through a first current path passing through the normally-off switching element 5*u* and the normally-on switching element 4*u* of the cascode element 21*u* and a second current path passing through the high-speed diode 6*u*. In this case, by adopting a cascode element whose voltage drop clue to current inflow is less than that of the high-speed diode 6*u* as the cascode element 21*u*, the entire return current can be made to flow in the cascode element 21*u*.

Next, a case where the cascode element 21*u* is turned OFF and both the cascode elements 21*u* and 21*x* assume an OFF state, i.e., operation during a dead time period will be described.

Also in this case, an induction component causes the return current to continue flowing into the positive-side DC bus 1*p* from the output terminal U through the U-phase arm. The return current flows through the second current path passing through the high-speed diode 6*u* and a third current path passing through a built-in diode (not illustrated) of the normally-off switching element 5*u* and the normally-on switching element 4*u*. In this case, a high-speed diode whose voltage drop due to current inflow is less than that of the built-in diode (not illustrated) of the normally-on switching element 4*u* has been adopted as the high-speed diode 6*u*, so that the entire return current is made to flow through the second current path, i.e., flow in the high-speed diode 6*u*.

When the cascode element 21*x* is turned ON, reverse recovery current flows in the high-speed diode 6*u* by the residual charge, followed by the high-speed diode 6*u* has shutoff. Thus, a short circuit connecting the DC power supply 1, a positive-side DC bus p1, the high-speed diode 6*u*, the cascode element 21*x* (ON state), a negative-side DC bus 1*n*, and the DC power supply 1 in this order is formed, whereby short-circuit current flows until the reverse recovery of the high-speed diode 6*u* is achieved.

A high-speed diode whose reverse recovery time is shorter than that of the built-in diode (not illustrated) of the normally-on switching element 4*u* has been adopted as the high-speed diode 6*u*, so that the reverse recovery loss of the high-speed diode 6*u* is small.

Operation in the arms of other phases than the U-phase is basically the same as that in the U-phase, and operation in the case where the negative arm-side cascode element is turned OFF while the positive arm-side cascode element is turned ON is the same as abovementioned operation, so that descriptions thereof will be omitted.

Next, a case where the DC power supply 1 has DC power and loss of gate power supply has occurred will be described.

With the occurrence of the loss of gate power supply, gate supply to the cascode element 21 is lost. That is, the gate-source voltage of the normally-off switching element 5 becomes 0 [V], and the normally-off switching element 5 assumes an OFF state. Then, positive voltage is generated in a drain-source direction of the normally-off switching element 5 by the DC power supply 1. At this time, the gate of the normally-on switching element 4 and the source of the normally-off switching element 5 are connected (cascode-connected) through the cascode-connecting diode 7, so that negative voltage is applied between the gate and the source of the normally-on switching element 4, putting the normally-on switching element 4 into an OFF state. That is, at the loss of gate power supply, the cascode element 21 assumes an OFF state. This prevents the inverter main circuit 3 from failing due to DC short circuit.

Also in the case where the DC power supply 1 does not have DC power and the output terminals U, V, and W of the inverter main circuit 3 are used in utility grid interconnection, the cascode element 21 assumes an OFF state. This prevents the inverter main circuit 3 from failing clue to DC short circuit.

Effect

As described above, according to the power conversion device of the first embodiment, switching loss caused by the reverse recovery current can be reduced to reduce heat generation loss occurring in association with the switching loss, which contributes a size reduction of the cascode element and then to a size reduction of the inverter main circuit. Further, at power-on time or at abnormal time, short-circuit fault can be prevented.

Further, the reduction of the heat generation loss due to the switching loss can eliminate the need to provide a cooling heat sink or can reduce the size of the cooling heat sink. As a result, the size of the power conversion device can be reduced.

Second Embodiment

Figure 2:
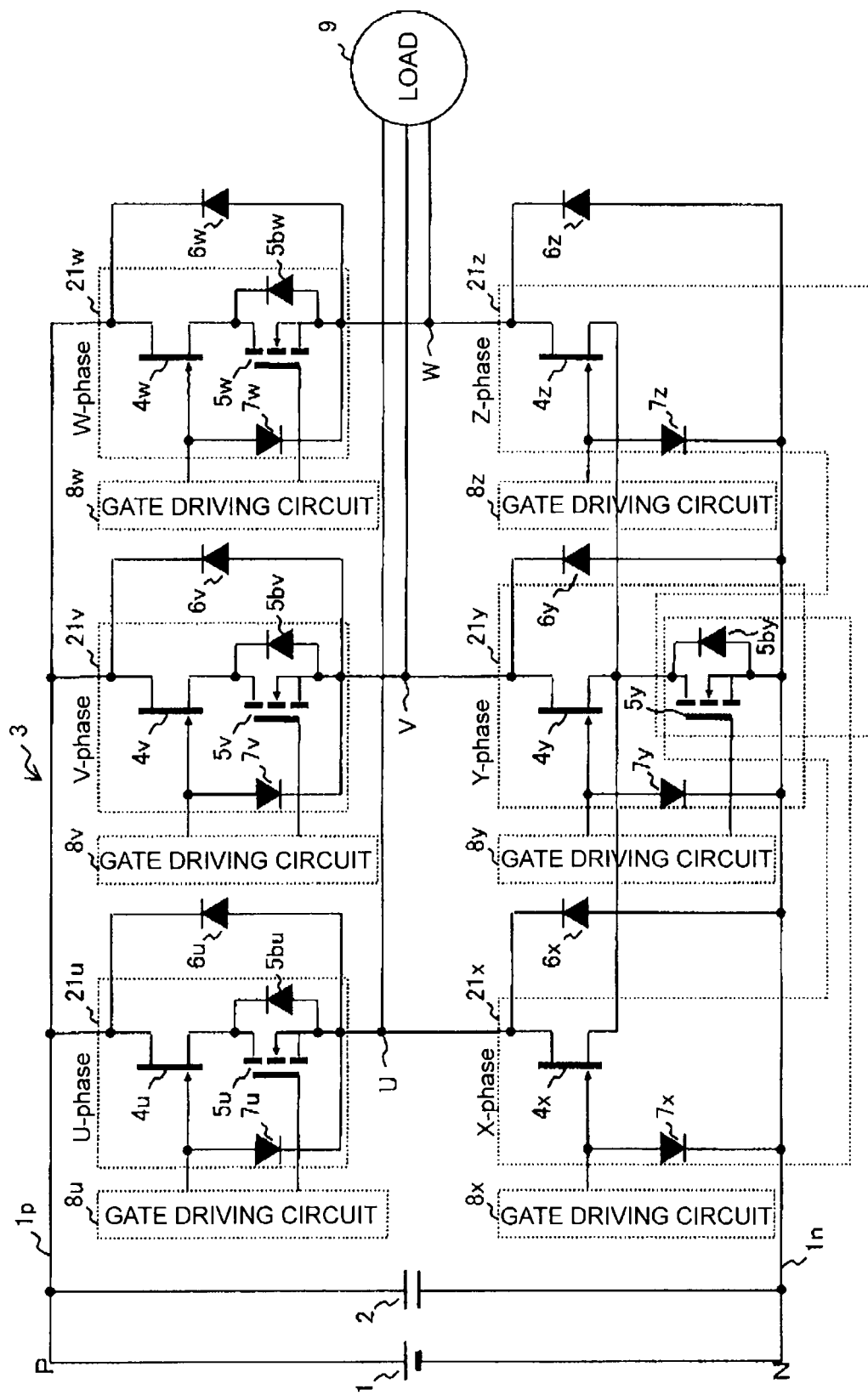
FIG. 2 is a main circuit diagram illustrating a configuration of the power conversion device according to a second embodiment of the present invention.

FIG. 2 is a main circuit diagram of the power conversion device according to a second embodiment.

Configuration

The second embodiment significantly differs from the first embodiment illustrated in FIG. 1 in the configuration of the negative arm. Other configurations are the same as those of the first embodiment.

In the second embodiment, the cascode elements 21*u*, 21*v*, and 21*w* each constituting the positive arm are constructed as in the first embodiment. That is, the normally-on switching elements 4*u*, 4*v*, and 4*w* and normally-off switching elements 5*u*, 5*v*, and 5*w* are electrically connected in series, and the cascode-connecting diodes 7*u*, 7*v*, and 7*w* are connected (cascode-connected) in a forward direction between the gates of the normally-on switching elements 4*u*, 4*v*, and 4*w*, and the sources of the normally-off switching elements 5*u*, 5*v*, and 5*w*. The diodes 5*bu*, 5*bv*, . . . , and 5*bz* are incorporated between the source regions and the drain regions of the normally-off switching elements 5*u*, 5*v*, 5*w*, 5*x*, 5*y*, and 5*z*. Further, the high-speed diodes 6*u*, 6*v*, 6*w*, 6*x*, 6*y*, and 6*z* are connected in reverse parallel between the drains of the normally-on switching elements 4*u*, 4*v*, 4*w*, 4*x*, 4*y*, and 4*z* and the sources of the normally-off switching elements 5*u*, 5*v*, 5*w*, 5*x*, 5*y*, and 5*z*.

The gates of the normally-on switching elements 4*u*, 4*v*, and 4W and the gates of the normally-off switching elements 5*u*, 5*v*, and 5*w* are connected to the gate driving circuits 8*u*, 8*v*, and 8*w*, respectively.

However, in the second embodiment, the configuration of the negative arm differs from the first embodiment as follows.

That is, the normally-on switching elements 4*x*, 4*y*, and 4*z* of the X, Y, and Z-phase arms and a normally-off switching element 5*y* shared by the X, Y, and Z-phase arms are electrically connected in series, and the cascode-connecting diodes 7x, 7y, and 7z are connected (cascode-connected) in the forward direction between the gates of the normally-on switching elements 4x, 4y, and 4z, and the negative-side DC bus 1n.

Further, the high-speed diodes 6x, 6y, and 6z are connected in reverse parallel between the drains of the normally-on switching elements 4x, 4y, and 4z and the negative-side DC bus 1n.

The gates of the normally-on switching elements 4x, 4y, and 4z are connected to the gate driving circuits 8x, 8y, and 8z, respectively, and the gate of the normally-off switching element 5y is connected to the gate driving circuit 8y.

The sharing of the normally-off switching elements 5y among the negative arm of the respective phases achieves a shared use of the invalid area (e.g., chip outer periphery) of the semiconductor chip and prevents the three phases from being conductive simultaneously. Thereby the area of the semiconductor chips of the normally-off switching elements 5y is smaller than the total area of the semiconductor chips of the normally-off switching elements 5x, 5y, and 5z in the first embodiment.

Output terminals U, V, and W of the inverter main circuit 3 are connected to the load 9, for example, an AC electric motor.

Also in the second embodiment, the number of levels of the inverter main circuit 3 may be three or more, and the output phase thereof may be single-phase or multi-phase.

Further, although the normally-off switching element 5y is provided in the y-phase in the above description, it may be provided in the X-phase or Z-phase and may be provided in any phase in a multi-level inverter.

Operation

The turn ON operation and turn OFF operation of the cascode elements of FIG. 2 is the same as those in the first embodiment, so that the descriptions thereof will be omitted.

A case where the return current flows from the negative-side DC bus 1n to output terminal U when the cascode element 21u is in an ON state and the cascode element 21x is in an OFF state will be described.

In this case, the return current flows into the output terminal U through the first current path passing through the normally-off switching element 5y and the normally-on switching element 4x of the cascode element 21x and the second current path passing through the high-speed diode 6x.

In this case, by adopting a cascode element whose voltage drop due to current inflow is less than that of the high-speed diode 6x as the cascode element 21x, the entire return current can be made to flow in the cascode element 21x.

Next, a case where the cascode element 21x is turned OFF and both the cascode elements 21u and 21x assume an OFF state, i.e., operation during a dead time period will be described.

Also in this case, an induction component causes the return current to continue flowing into the output terminal U from the negative-side DC bus 1n. The return current flows through the second current path passing through the high-speed diode 6u and the third current path passing through the normally-off switching element 5y and a built-in diode (not illustrated) of the normally-on switching element 4x. In this case, a high-speed diode whose voltage drop due to current inflow is less than that of the built-in diode of the normally-on switching element 4x has been adopted as the high-speed diode 6x, so that the entire return current is made to flow through the second current path, i.e., flow in the high-speed diode 6x.

When the cascode element 21u is turned ON, reverse recovery current flows in the high-speed diode 6x by the residual charge, followed by shutoff of the high-speed diode 6x. Thus, a short circuit connecting the DC power supply 1, positive-side DC bus p1, cascode element 21u (ON state), high-speed diode 6x, negative-side DC bus 1n, and the DC power supply 1 in this order is formed, whereby short-circuit current flows until the reverse recovery of the high-speed diode 6x is achieved.

A high-speed diode whose reverse recovery time is shorter than that of the built-in diode (not illustrated) of the normally-on switching element 4x has been adopted as the high-speed diode 6x, so that the reverse recovery loss of the high-speed diode 6x is small.

Operations with respect to the Y-phase and Z-phase except for the X-phase are basically the same as those in the X-phase, so that the descriptions thereof will be omitted.

Next, a case where the DC power supply 1 has DC power and loss of gate power supply has occurred will be described.

Also in this case, the same operation as in the first embodiment is performed and, in the negative arm constituting the X, Y, and Z-phases, negative voltage is applied between the gate and the source of each of the normally-on switching elements 4x, 4y, and 4z with the normally-off switching element 5y shared by the X, Y, and Z-phase arms, putting the normally-on switching elements 4x, 4y, and 4z into an OFF state.

That is, at the loss of gate power supply, the cascode element 21 assumes an OFF state. This prevents the inverter main circuit from failing due to DC short circuit.

Effect

As described above, according to the power conversion device of the second embodiment, the following effect can be obtained in addition of the effect obtained in the first embodiment. That is, by the sharing of the normally-off switching element of the negative arm, cost of the cascode element and then the cost of the inverter main circuit can be reduced as compared with the case of the first embodiment.

Third Embodiment

Figure 3:
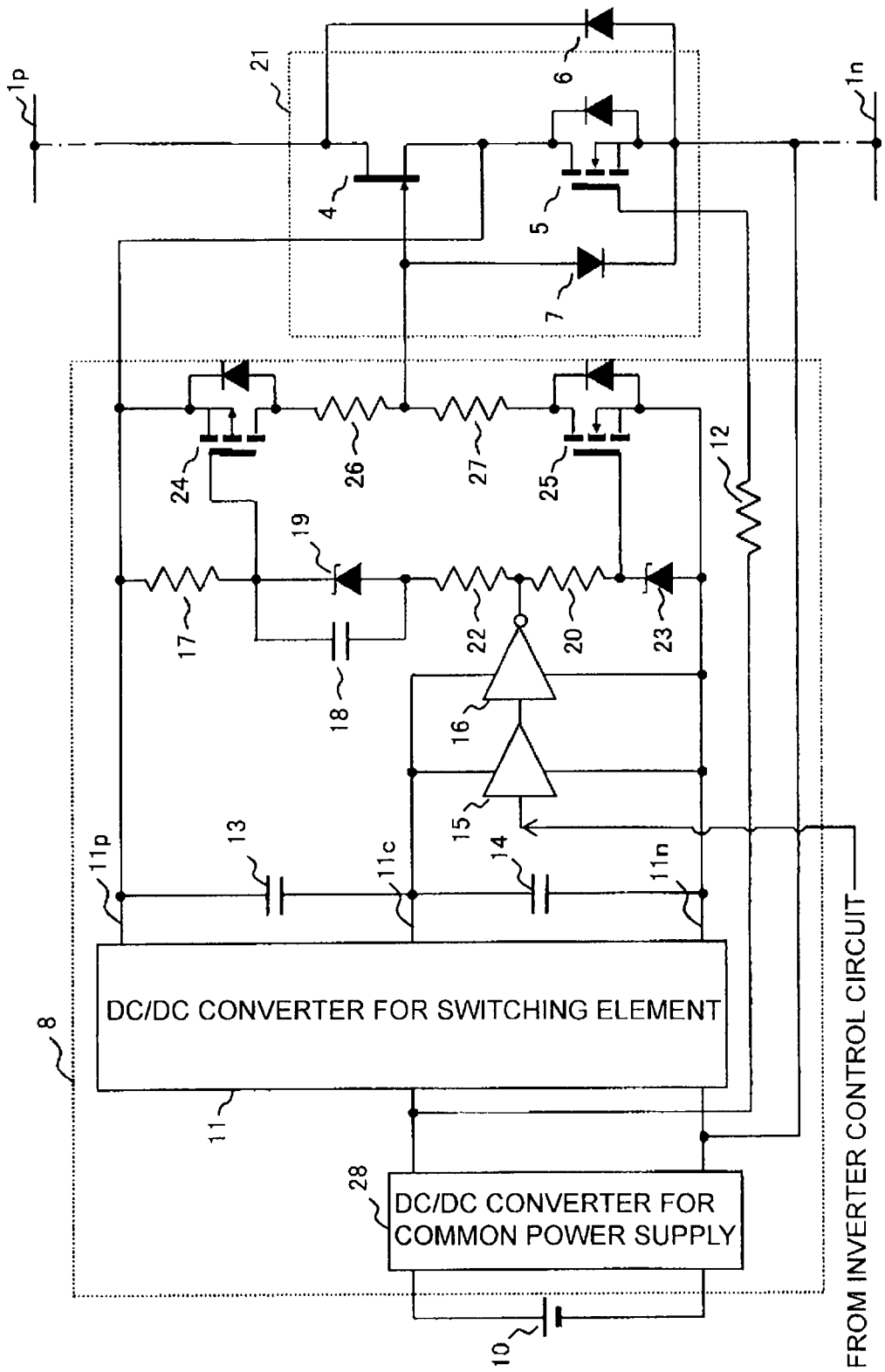
FIG. 3 is a circuit diagram illustrating a concrete configuration of a gate drive according to a third embodiment of the present invention.
Figure 4:
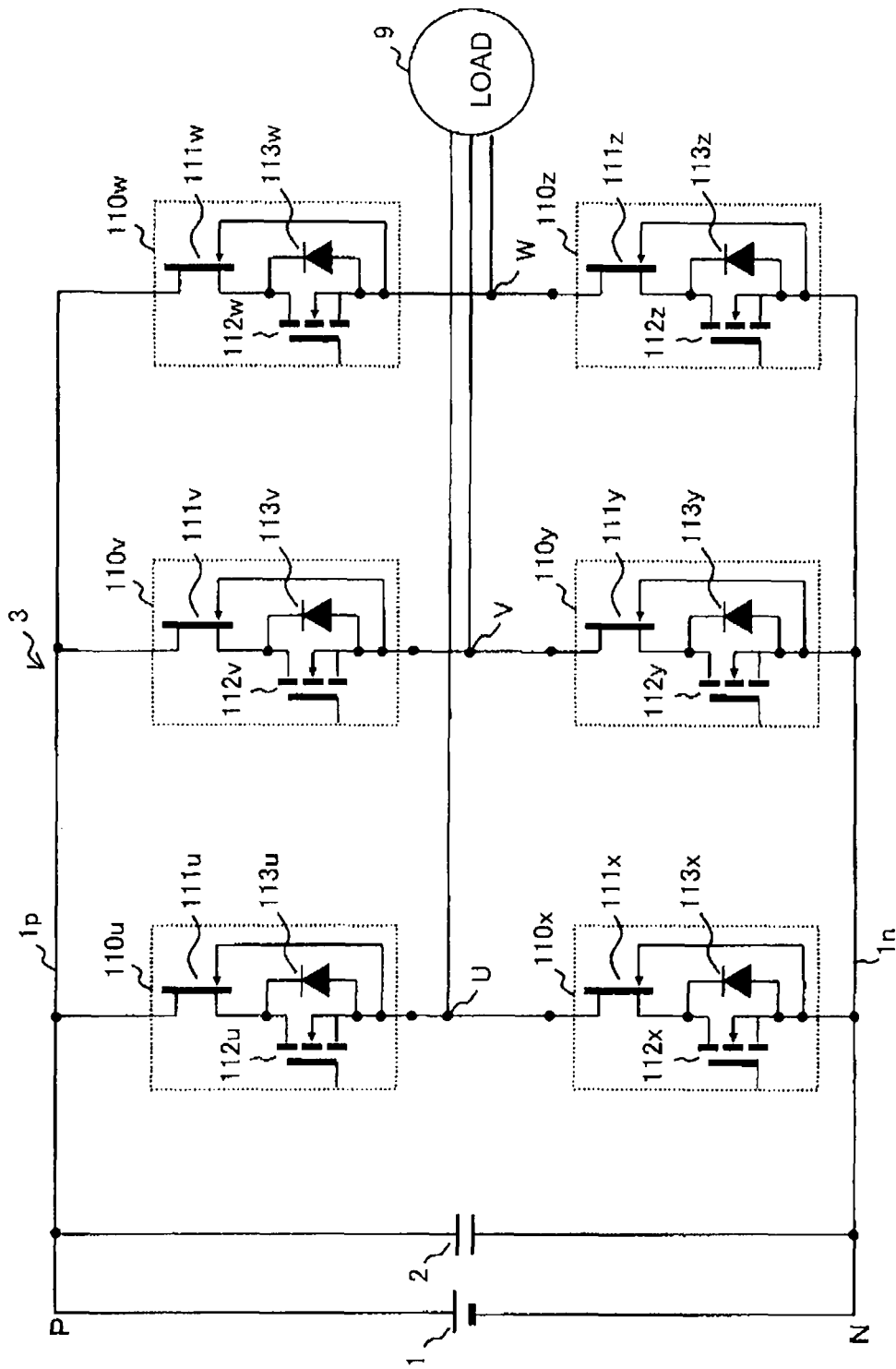
FIG. 4 is a main circuit diagram illustrating a power conversion device of a related art.

FIG. 3 is a circuit configuration diagram of a third embodiment in which the gate driving circuit of the first and the second embodiments is embodied.

Configuration

In FIG. 3, the same reference numerals are given to the same parts as those illustrated in FIGS. 1 and 2 for avoiding an overlapping description.

In FIG. 3, a low-voltage DC power supply 10 is obtained by converting rectified DC power supply 1 using a DC/DC converter.

The output of the low-voltage DC power supply 10 is connected to the input of an insulated DC/DC converter for common power supply (DC/DC converter for common power supply in FIG. 3) for the purpose of achieving electrical insulation between the arms.

The insulated DC/DC converter 28 for common power supply is a power supply common to all the gate driving circuits for driving the normally-on switching element 4 and the normally-off switching element 5.

The output of the insulated DC/DC converter 28 for common power supply is connected between the gate and the source of the normally-off switching element 5 through the input terminal of an insulated DC/DC converter (DC/DC converter for switching element in FIG. 3) 11 for normally-off switching element and a gate resistor 12. As a result, the insulated DC/DC converter 11 for normally-off switching element achieves electrical insulation between power sources for the normally-on switching element 4 and the normally-off switching element 5.

The insulated DC/DC converter 11 for normally-off switching element has two channel outputs (e.g., ±24 [V]), and the outputs are connected in series to obtain 48 [V] power supply. Capacitors 13 and 14 are connected in parallel among output terminals of the insulated DC/DC converter 11 for normally-off switching element for output voltage stabilization. A positive-side DC bus 11p of 48 [V] power supply is connected to the source of the normally-on switching element 4, and a negative-side DC bus 11n thereof is connected to the gate of the normally-on switching element 4 through a series circuit composed of a gate drive n-type MOSFET 25 and a gate resistor 27.

A capacitor 13 is connected in parallel between the positive-side DC bus 11p and an intermediate DC bus 11c of the insulated DC/DC converter 11 for normally-off switching element. Further, a capacitor 14, a signal transmission element 15, and a logic signal inversion element 16 are connected in parallel between the intermediate DC bus 11c and the negative-side DC bus 11n.

Further, a resistor 17, a circuit composed of a capacitor 18 and a zener diode 19 connected in parallel, a resistor 22, a resistor 20, and a zener diode 23 are connected in series in this order from the positive side between the positive-side DC bus lip and the negative-side DC bus 11n.

Further, in parallel to the above series circuit, a gate drive p-type MOSFET 24, a gate resistor 26, a gate resistor 27, and a gate drive n-type MOSFET 25 are connected in series in this order from the positive side.

The gate drive n-type MOSFET 25 and the gate drive p-type MOSFET 24 bear a complementary (a pair of n and p-types having the same characteristics) relationship and are connected such that when one of them is turned ON, the other one is turned OFF. That is, the gate of the gate drive p-type MOSFET 24 is connected to the cathode of the zener diode 19, and the gate of the gate drive n-type MOSFET 25 is connected to the cathode of the zener diode 23.

The zener diode 19 and the zener diode 23 are selected so as to adjust voltage to be input to the gates of the gate drive p-type MOSFET 24 and the gate drive n-type MOSFET 25 to predetermined values, respectively.

The signal transmission element 15 plays a role of transmitting a signal from an inverter control circuit (not illustrated) to the logic signal inversion element 16 while providing electrical insulation between the inverter control circuit and the gate driving circuit 8. The signal transmission element 15 of FIG. 3 has a characteristic of outputting an ON signal when receiving an ON signal from the inverter control circuit (not illustrated). The logic signal inversion element 16 is connected so as to invert the polarity of an output signal from the signal transmission element 15 and supplies it between the resistors 22 and 20.

Operation

In FIG. 3, when the power conversion device is operating based on a signal that is supplied from the inverter control circuit (not illustrated) to signal transmission element 15, ON voltage (e.g., 15 [V]) is constantly applied to the gate of the normally-off switching element 5 to maintain turn-ON state of the normally-off switching element 5.

When the insulated DC/DC converter 28 for common power supply is turned ON, the normally-off switching element 5 is maintained in an ON state. At the same time, the gate of the normally-on switching element 4 is driven through the insulated DC/DC converter 11 for normally-on switching element.

A method of driving the gate of the normally-on switching element 4 will be described.

When the gate drive p-type MOSFET 24 is tuned ON, the source and the gate of the normally-on switching element 4 assume the same potential, i.e., 0 [V], and the normally-on switching element 4 is tuned ON. At this time, the gate drive p-type MOSFET 24 is tuned ON, the gate drive n-type MOSFET 25 having a complementary relationship with the gate drive p-type MOSFET 24 is in an OFF state.

Then, when the gate drive n-type MOSFET 25 is turned ON, the negative-side bus 11n of the insulated DC/DC converter 11 for normally-on switching element is connected to the gate of the normally-on switching element 4, and the positive-side bus lip of, e.g., 48 [V] power supply connected in series to the output of the insulated DC/DC converter 11 for normally-off switching element is connected to the source of the normally-on switching element 4. That is, 48 [V] negative bias (−48 [V]) is input to the gate of the normally-on switching element 4, turning OFF the normally-on switching element 4. At this time, the gate drive p-type MOSFET 24 is in an OFF state.

When the signal from the not illustrated inverter control circuit is ON, the signal transmission element 15 outputs an ON signal (e.g., 24 [V]). The ON signal is then converted into an OFF signal (0 [V]) by the logic signal inversion element 16. The OFF signal (0 [V]) output from the logic signal inversion element 16 is input to the gate of the gate drive n-type MOSFET 25, turning OFF the gate drive n-type MOSFET 25.

On the other hand, the OFF signal is adjusted by the characteristic of the zener diode 19 to a voltage that turns ON the gate drive p-type MOSFET 24, and the adjusted voltage is then input to the gate of the gate drive p-type MOSFET 24 having a complementary relationship with the gate drive n-type MOSFET 25, turning ON the gate drive p-type MOSFET 24.

With this operation, the source and the gate of the normally-on switching element 4 assume the same potential, i.e., 0 [V], turning ON the normally-on switching element 4.

When the signal from the inverter control circuit is OFF, the signal transmission element 15 outputs an OFF signal (0 [V]). The OFF signal (0 [V]) is then converted into an ON signal (e.g., 24 [V]) by the logic signal inversion element 16.

The ON signal (24 [V]) output from the logic signal inversion element 16 is adjusted by the characteristic of the zener diode 23 to a voltage that turns ON the gate drive n-type MOSFET 25, and the adjusted voltage is then input to the gate of the gate drive n-type MOSFET 25, turning ON the gate drive n-type MOSFET 25.

On the other hand, the ON signal (24 [V]) output from the logic signal inversion element 16 is adjusted by the capacitor 18 to a voltage that turns OFF the gate drive p-type MOSFET 24, and the adjusted voltage is then input to the gate of the gate drive p-type MOSFET 24 having a complementary relationship with the gate drive n-type MOSFET 25, turning OFF the gate drive p-type MOSFET 24.

The voltage to be input to the gate drive p-type MOSFET 24 is shifted to negative bias by the capacitor 18, thus turning OFF the gate drive p-type MOSFET 24 at high-speed.

With the above operation, the negative-side bus of 48 [V] power supply is connected to the gate of the normally-on switching element 4, and the positive-side bus of 48 [V] power supply is connected to the source of the normally-on switching element 4. That is, 48 [V] negative bias (−48 [V]) is input to the gate of the normally-on switching element 4, turning OFF the normally-on switching element 4.

The normally-on switching element 4 can be turned OFF even when the return current is flowing, so that the return current can be made to flow into the high-speed diode G. Since a high-speed diode whose reverse recovery time is shorter than that of the built-in diode of the normally-on switching element 4 has been adopted as the high-speed diode 6, so that the reverse recovery loss of the high-speed diode 6u is small.

The normally-on switching element 4 can be driven (turned ON/OFF) by a signal (ON/OFF signal) of the not illustrated inverter control circuit to be input to the signal transmission element 15.

The output (e.g., 48 [V]) of the insulated DC/DC converter 11 for normally-on switching element is input between the gate and the source of the normally-on switching element 4 at −48 [V] (at 48 V between source and gate) in the above description; actually, however, the same voltage is not applied due to voltage drop across the fate drive n-type MISFIT 25 and the gate resistor 27.

Next, a case where loss of gate power supply has occurred will be described

With the occurrence of the loss of gate power supply, power supply to the insulated DC/DC converter 28 for common power supply is lost. That is, the gate-source voltage of the normally-off switching element 5 becomes 0 [V], and the normally-off switching element 5 assumes an OFF state. Then, positive voltage is generated in a drain-source direction of the normally-off switching element 5 by the DC power supply 1. At this time, the gate of the normally-on switching element 4 and the source of the normally-off switching element 5 are connected (cascode-connected) through the cascode-connecting diode 7, so that negative voltage is applied between the gate and the source of the normally-on switching element 4, putting the normally-on switching element 4 into an OFF state. That is, at the loss of gate power supply, the cascode element 21 assumes an OFF state. This operation of the gate driving circuit 8 prevents the inverter main circuit 3 from failing due to DC short circuit.

It is possible to handle the cascode element in an equivalent manner to the normally-off switching element while achieving the gate driving circuit used in the first and the second embodiments. Thus, a high-security power conversion device can be provided.

The signal transmission element 15 with typical output characteristics has been assumed in FIG. 3. When an inverted output signal transmission element that receives an ON signal from the inverter control circuit and then outputs an OFF signal is used in place of the signal transmission element 15, the logic signal inversion element 16 of FIG. 3 can be omitted.

In the first and the second embodiments, a common source is shared by the normally-off switching elements 5x, 5y, and 5z of the negative arm of X, Y, and Z-phases of the inverter main circuit 3, so that the insulated DC/DC converter 28 for common power supply in FIG. 3 can be shared in the negative arm and combined into one. Thus, the whole number of the insulated DC/DC converters 28 for common power supply is reduced from six (corresponding to six phases) to four.

Effect

As described above, according to the power conversion device of the third embodiment, the following effect can be obtained in addition of the effect obtained in the first embodiment. That is, by the sharing of the insulated DC/DC converter for common power supply by the negative arm, cost reduction can be achieved.

Fourth Embodiment

Configuration

The fourth embodiment is featured in that the withstand voltage of the normally-off switching element 5 is set to a lower value than that of the normally-on switching element 4 in the first to third embodiments. The withstand voltage of the normally-off switching element 5 may be set to a value corresponding to voltage to be input to the gate so as to turn OFF the normally-on switching element 4.

Operation

The same operation as in the first to third embodiments is performed in the fourth embodiment.

In general, when the withstand voltage of a semiconductor element is reduced, on-resistance thereof can be reduced. By setting the withstand voltage of the normally-off switching element 5 to a lower value than that of the normally-on switching element 4, on-resistance of the normally-off switching element 5 can be reduced to reduce conduction loss. Further, when semiconductor elements are compared under the condition of the same current rating, one having a lower withstand voltage is of greater advantage for cost reduction.

Effect

As described above, according to the power conversion device of the fourth embodiment, the following effect can be obtained in addition of the effect obtained in the first embodiment. That is, by lowering the withstand voltage of the normally-off switching element, cost of the semiconductor element and then the cost of the inverter main circuit can be reduced.

Fifth Embodiment

Configuration

The fifth embodiment is featured in that the withstand voltage of the cascode-connecting diode 7 is set equal to that of the normally-off switching element 5 in the first to fourth embodiments.

The withstand voltage of the cascode-connecting diode 7 may be set to a value corresponding to voltage to be input to the gate so as to turn OFF the normally-on switching element 4, that is, may be equal to the withstand voltage of the normally-off switching element 5.

Operation

The same operation as in the first to third embodiments is performed in the fifth embodiment.

In general, when the withstand voltage of a semiconductor element is reduced, on-resistance thereof can be reduced. By setting the withstand voltage of the cascode-connecting diode 7 equal to that of the normally-off switching element 5, cost of the semiconductor element can be reduced.

Effect

As described above, according to the power conversion device of the fifth embodiment, the following effect can be obtained in addition of the effects obtained in the first to third embodiments. That is, by setting the withstand voltage of the cascode-connecting diode equal to that of the normally-off switching element, cost of the semiconductor element and then the cost of the inverter main circuit can be reduced.

Sixth Embodiment

Configuration

The sixth embodiment is featured in that the high-speed diode 6 is a unipolar diode in the power conversion device according to the first to fifth embodiments.

Operation

In the present embodiment configured as above, minority carriers are not accumulated in the unipolar diode, and thus reverse recovery charge is not formed therein, so that the reverse recovery current does not flow, resulting in essentially no reverse recovery loss. Although there are charges accumulated in junction capacitance of the unipolar diode, the charged current of the junction capacitance is negligible. Therefore, the loss of the high-speed diode can be reduced.

Further, it is possible to prevent the reverse recovery current from flowing into the cascode element of the opposite arm in a turn-ON transient state, thereby reducing the switching loss of the cascode element 21.

Effect

As described above, according to the power conversion device of the sixth embodiment, the same effect as in the first embodiment can be obtained.

Seventh Embodiment

Configuration

The seventh embodiment is featured in that the high-speed diode 6 which is a unipolar diode formed as a Schottky Barrier Diode (SBD), a Junction Barrier Controlled Schottky Diode, or a Merged PiN Schottky Diode.

Operation

Minority carriers are not accumulated the unipolar diode, and thus reverse recovery charge is not formed therein, so that the reverse recovery current does not flow. The unipolar diode has only charges accumulated in a junction capacitance component, so that the reverse recovery loss is extremely small. Therefore, the loss of the high-speed diode 6 can be reduced.

Further, it is possible to prevent the reverse recovery current from flowing into the cascode element of the opposite arm in a turn-ON transient state, thereby reducing the switching loss of the cascode element 21.

The SBD (Schottky Barrier Diode) can practically be used for the unipolar diode. The SBD is shorter in reverse recovery time and thus smaller in reverse recovery loss than those of the built-in diode of the normally-on switching element 4. In addition, the Junction Barrier Controlled Schottky Diode (JBS) or a Merged PiN Schottky Diode (MPS) each in which Schottky junction and a PiN junction coexist can be used for the unipolar diode.

Effect

As described above, according to the power conversion device of the seventh embodiment, the same effect as in the first embodiment can be obtained.

Eighth Embodiment

Configuration

The eighth embodiment is featured in that the normally-on switching element 4 is constituted by a wide-gap semiconductor such as SiC (silicon carbide), GaN (gallium nitride), or diamond in the power conversion device according to any of the first to seventh embodiments.

Operation

According to the eighth embodiment, in comparison with a silicon semiconductor, the normally-on switching element 4 constituted by the wide-gap semiconductor can increase breakdown electric field strength by about one digit and can reduce the thickness of a drift layer for keeping the withstand voltage to about one-tenth, thereby reducing the conduction loss of the normally-on switching element 4.

Further, in comparison with a silicon semiconductor, the normally-on switching element 4 constituted by the wide-gap semiconductor can increase a saturated electron drift speed about twice, thus allowing for implementation of a high frequency about ten times increased. This allows turn-on and turn-off losses of the normally-on switching element 4 to be reduced.

Effect

As described above, according to the eighth embodiment, the use of the normally-on switching element 4 constituted by the wide-gap semiconductor allows the conduction loss and switching loss of the normally-on switching element 4 to be reduced, thereby providing the inverter main circuit with lower loss and smaller size.

Ninth Embodiment

Configuration

The ninth embodiment is featured in that the high-speed diode 6 is constituted by a wide-gap semiconductor such as SiC (silicon carbide), GaN (gallium nitride), or diamond in the power conversion device according to any of the first to eighth embodiments.

Operation

According to the ninth embodiment, in comparison with a silicon semiconductor, the high-speed diode 6 constituted by the wide-gap semiconductor can increase breakdown electric field strength by about one digit, thereby achieving high withstand voltage of the high-speed diode 6. For example, in the case of high withstand voltage, the high-speed diode 6 constituted by the silicon semiconductor can be used only in a bipolar configuration, while the high-speed diode 6 constituted by the wide-gap semiconductor can be used even in a unipolar configuration. Even in the case where a high-speed diode having the high withstand voltage is used, the reverse recovery loss is reduced to reduce the loss of the high-speed diode 6 as in the sixth embodiment.

Further, the loss of the cascode element 21 can be reduced as in the sixth embodiment.

If a high-withstand voltage unipolar diode is constituted by silicon, the conduction loss is so large that the diode cannot practically be used. Among commercially available silicon unipolar diodes (e.g., Schottky Barrier Diode), the withstand voltage of a product called "high withstand voltage" diode is about 200 [V] at most. In the case where the unipolar diode is constituted by the wide-gap semiconductor, a high-speed diode 6 having a high withstand voltage of e.g., 1200 [V] can be realized.

Effect

As described above, according to the ninth embodiment, by using the high-speed diode 6 constituted by the wide-gap semiconductor, the loss of the cascode element 21 can be reduced, thereby allowing a small-sized power conversion device to be provided.

While certain embodiments have been described, these embodiments have been presented by way of example only, and are not intended to limit the scope of the inventions. Indeed, the novel embodiments described in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

What is claimed is:

1. A power conversion device comprising:
a DC power source; a plurality of main circuit switching elements constituting a positive arm and a negative arm which are bridge-connected so as to convert DC of the DC power source into AC; high-speed diodes connected in reverse parallel to the plurality of main circuit switching elements, respectively; and gate driving circuits that perform switching of the plurality of main circuit switching elements, respectively, at a desired timing,
the main circuit switching elements constituting the positive and the negative arms each including a normally-on switching element, a normally-off switching element whose positive terminal is connected to the negative terminal of the normally-on switching element, and a cascode-connecting diode series-connected between the gate of the normally-on switching element and the negative terminal of the normally-off switching element in a forward direction, and
each of the gate driving circuit being connected to the gate of the normally-on switching element and the normally-off switching element constituting the main circuit switching element.

2. The power conversion device according to claim 1, wherein
the gate driving circuit drives the normally-on switching element and the normally-off switching element in an independent manner.

3. The power conversion device according to claim 1, wherein
withstand voltage of the normally-off switching element is set lower than that of the normally-on switching element.

4. The power conversion device according to claim 1, wherein
withstand voltage of the cascode-connecting diode is set equal to that of the normally-off switching element.

5. The power conversion device according to claim 1, wherein
the high-speed diode is a unipolar diode.

6. The power conversion device according to claim 5, wherein
the unipolar diode is a Schottky Barrier Diode, a Junction Barrier Controlled Schottky Diode, or a Merged PiN Schottky Diode.

7. The power conversion device according to claim 1, wherein
the normally-on switching element is constituted by a wide-gap semiconductor.

8. The power conversion device according to claim 7, wherein
the wide-gap semiconductor is SiC (silicon carbide), GaN (gallium nitride), or diamond.

9. The power conversion device according to claim 1, wherein
the high-speed diode is constituted by a wide-gap semiconductor.

10. The power conversion device according to claim 9, wherein
the wide-gap semiconductor is SiC (silicon carbide), GaN (gallium nitride), or diamond.

11. A power conversion device comprising:
a DC power source; a plurality of main circuit switching elements constituting a positive arm and a negative arm which are bridge-connected so as to convert DC of the DC power source into AC; a plurality of high-speed diodes connected in reverse parallel to the main circuit switching elements, respectively; and a plurality of gate driving circuits that perform switching of the main circuit switching elements, respectively, at a desired timing,
the main circuit switching elements constituting the positive arm including a normally-on switching element, a normally-off switching element whose positive terminal is connected to the negative terminal of the normally-on switching element, and a cascode-connecting diode series-connected between the gate of the normally-on switching element and the normally-off switching element in a forward direction,
the main circuit switching elements constituting the negative arm including normally-on switching elements provided for respective phases, a normally-off switching element shared by respective phases and whose positive terminal is connected to the negative terminals of the normally-on switching elements, and a plurality of cascode-connecting diodes series-connected between each of the gates of the normally-on switching element and the negative terminal of the normally-off switching element, and
each of the gate driving circuit being connected to the gate of the normally-on switching element and the normally-off switching element constituting the main circuit switching element.

12. The power conversion device according to claim 11, wherein
the gate driving circuit drives the normally-on switching element and the normally-off switching element in an independent manner.

13. The power conversion device according to claim 11, wherein withstand voltage of the normally-off switching element is set lower than that of the normally-on switching element.

14. The power conversion device according to claim 11, wherein
withstand voltage of the cascode-connecting diode is set equal to that of the normally-off switching element.

15. The power conversion device according to claim 11, wherein
the high-speed diode is a unipolar diode.

16. The power conversion device according to claim 15, wherein
the unipolar diode is a Schottky Barrier Diode, a Junction Barrier Controlled Schottky Diode, or a Merged PiN Schottky Diode.

17. The power conversion device according to claim 11, wherein
the normally-on switching element is constituted by a wide-gap semiconductor.

18. The power conversion device according to claim 17, wherein
the wide-gap semiconductor is SiC (silicon carbide), GaN (gallium nitride), or diamond.

19. The power conversion device according to claim 11, wherein
the high-speed diode is constituted by a wide-gap semiconductor.

20. The power conversion device according to claim 19, wherein
the wide-gap semiconductor is SiC (silicon carbide), GaN (gallium nitride), or diamond.

* * * * *